United States Patent Office 3,519,132
Patented July 7, 1970

3,519,132
METHOD OF FORMING COMPOSITE PHOTOGRAPHIC TRANSPARENCIES
James V. Oliver, New York, and Paul Maurice Barton, Bayside, N.Y., assignors to Warsaw Studios, Inc., New York, N.Y., a corporation of New York
No Drawing. Filed July 26, 1968, Ser. No. 747,790
Int. Cl. G03b 27/02
U.S. Cl. 355—79
7 Claims

ABSTRACT OF THE DISCLOSURE

A method wherein two or more photographic color transparencies are joined together by selecting a portion of one transparency and a complementary portion of another transparency to form a composite photo image. The individual separate transparencies, from which the supporting acetate backing has been removed, are individually mounted on a film base with the second transparency placed over the first transparency in a desired location. The first and second transparencies are cut while held in proper position and then the second transparency is placed into proper position with respect to the first transparency on the film base to provide a complete and accurate composite transparency.

---

The present invention relates generally to photgraphic procedure and specifically to an aspect of photographic procedures in which two or more individual color transparencies are joined together to produce a composite color transparency. Such composite transparencies are normally used in advertising and promotional work and enable the superposition of images from a number of different photographs into one composite whole.

In the production of composite color transparencies, two individual photographs are taken and normal transparencies are made. An artisan then carefully cuts the two transparencies in a desired pattern to join the one to the other or to insert an image from one into a space cut for that purpose from the other. The composite transparency is then used for reproduction in advertisements, catalogs or the like. This general procedure has been employed for some time by the photographic and advertising industry but the methods which have been used entail some significant disadvantages which are sought to be overcome by the present invention.

Transparencies comprise one or more emulsion layers which carry the image (normally there are three separate layers for the three primary colors in a color transparency) and which are supported on a relatively stiff and structurally strong base or backing normally formed of a cellulose acetate. The emulsion layers in total are in the order of .002-003 inch thick and are relatively flexible whereas the acetate layer is many times that thickness and is much harder and stronger. Thus, in the fine cutting which is required to make an accurate border on the two transparencies which are to be joined into a composite, artisans have found that the presence of the acetate backing inhibits good work or, at least, makes it extremely difficult. It is important that there be neither empty spaces nor overlapping at the borders of the individual parts of the composite; such bad conditions magnify, reflect and refract light projected through the composite transparency and thus produce a bad result. Therefore, it is desirable to eliminate the acetate backing but to do so in a way in which the emulsion layers maintain their integrity and in which they may be easily cut and then easily and accurately joined together. Another aspect of the problems associated with the present techniques is that even when the artisan is able to accurately cut the two transparencies with their acetate backings, because the edges of the acetate backings have a relatively large dimension, they form an optical surface which reflects and refracts light when the transparency is used later on in the printing process. The reflection or refraction of light from these edges causes light spots and heavy lines in the resulting photographic reproductions. In the known process where the acetate base is removed, it is difficult to accurately cut and align the thin emulsion layers. It is to correct these and other disadvantages that the present process was devised.

Accordingly, it is generally an object of the present invention to provide a method for making composite transparencies which is simpler than those used in the past and which easily produces a serviceable composite transparency.

Specifically, it is an object of the present invention to provide a process for combining two or more color transparencies from which the acetate backing has been removed in a manner which is easier to practice than the processes heretofore known and which produces a good result.

It is further within the contemplation of the present invention to provide a process for combining color transparencies in which the edges of two individual transparencies may be brought into close registry, free of overlaps and spaces which would produce bad results in later photographic steps.

In accordance with the present invention, there is provided a process for the production of composite color transparencies. The steps comprise taking a first color transparency from which the acetate backing has been removed and placing same in a softening liquid, for example warm water, and thereafter covering the first transparency with strip film cement or other similar adhesive. The first transparency is then placed upon a film base in intimate contact therewith and is allowed to set. A second color transparency is then similarly softened in a liquid bath which may include both cement and a wetting agent. The second transparency is placed over the first transparency at the desired location and a cut is made through the first transparency and the second transparency while the two are held stationary in the desired relationship one to the other. The excess materials of the first and second transparencies are removed. The retained portions of the second transparency is then covered with strip film cement and the transparency is then placed in the desired composite relationship on the film base with respect to the first transparency and allowed to set in place. The separate pieces are then covered with a single piece of strip film to complete the composite transparency which has individual pieces of emulsion layer sandwiched between two pieces of strip film.

The above brief summary of the present invention will be better understood by making reference to the following detailed description of the invention which, presents a specific example of the practice of the process, including recitation of specific chemicals preferably used in the practice of the process.

Prior to the process of the invention, transparencies are selected to be made into a composite and then cellulose acetate backings removed by any well-known procedure, such as those shown in U.S. Pat. No. 2,575,970 and U.S. Pat. No. 2,922,100. In those two patents, it is suggested that the acetate backing can be removed by a solvent such as acetone-acetate, ethylene glycol monomethyl ether acetate, propyl acetoacetate, butyl acetoacetate, ethyl acetate, di-ethyl chloride, methyl ethyl ketone or any one of the many other compounds which are well known in the art which will dissolve the backing but will not attack the emulsion layers of the transparency. By the removal of the stiff and thick acetate backing, the technician is left with a thin flexible and delicate membrane which contains the actual color image. Hereafter in this description, this film layer itself is referred to as a transparency.

In an illustrative and typical situation, a first photographic transparency will constitute the background and possibly a portion of the foreground of the finished composite and a second transparency photograph will provide an element appearing as an added element of the finished composite seen. Accordingly, in the following description of an illustrative embodiment of the invention, reference will be made to the first and second transparency. It should be appreciated that there can be and often are many more than two transparencies joined together to make a composite. For example, it is well known in a fashion scene to have one model wearing different dresses or in different poses. Obviously, a photograph cannot be taken to produce this result and therefore the result is made by means of the production of a composite of several different photographs.

A first transparency, from which the backing has been removed, is placed in a bath to soften it and make it relatively pliable. It has been found that a simple warm water bath (warm to the touch) adequately provides the result of making the first transparency limp. The first transparency, in its weak state, is then covered with conventional strip film cement, such as that sold under that descriptive name by Eastman Kodak. A layer of film base is prepared at least the size of the desired finished transparency and it is onto this base that the individual elements of the separate transparencies are mounted. The film base is preferably an ortho film base, normally an ester base, in order to provide advantageous results. The first transparency, in its limp state and covered with strip film cement, is laid onto the base and its tight adhesion to the base is insured by squeegeeing or other similar means. It has been found that covering the transparency on the film base at this point with a layer of flat glass and allowing the same to set for a few minutes aids in the stablility of the elements during the following steps.

A second transparency is placed into a generally similar bath in order to make it wet and limp. A small amount of strip film cement and an appropriate wetting agent may also be inserted into this base to insure easy movement between the first and second transparency in the film base and to decrease surface tension. The second transparency is laid over the first transparency at the location previously selected for the image of the second transparency with respect to the first. The artisan then carefully, with an extremely sharp blade (normally a razor blade), cuts through both the first transparency exactly along the line between those elements which will appear in the final composite. For example, if a picture of a person appearing in the second transparency were to be positioned adjacent a bicycle appearing in the first transparency, the transparency containing the figure would be placed over the transparency with the bicycle and the artisan would take his sharp knife and cut cleanly around the entire figure, at the extreme outside edges of the figure, while at the same time cutting the second transparency with an identical shape. This allows the portion of the second transparency with the figure to be inserted into the empty area remaining in the first transparency after the waste material has been removed. During this cutting process, the artisan is extremely careful not to move the second transparency and is careful to insure that the cuts which he does make are clean and sharp. The artisan is further careful not to cut into the supporting film base below. The waste portions of the second transparency (the portions surrounding that portion which is to be used in the composite) and the waste portion of the first transparency (that portion which is to be replaced by part of the second transparency) are removed and discarded. The desired portion of the second transparency is then placed into a tray of strip film cement in order to completely coat it with cement free of bubbles and the like. It is then carefully placed into the empty spot on the film base left by the removal of the waste portion of the first transparency. That portion of the second transparency is made to adhere firmly to the transparency of the film base by squeegeeing or the like and a flat weight, such as a sheet of glass, is set over the entire structure to insure firm adhesion. The entire surface of the two transparencies is then covered with strip film attached with appropriate adhesive forming in combination, the desired composite transparency.

When a composite transparency is made in accordance with this process, a lesser degree of skill is required than that which was demanded in the prior art techniques using transparencies having the acetate backing or even those using a stripped emulsion layer in dry form. By the process described here, sharp registry is achieved in a relatively easy manner. Even if an error is made and there is a slight overlapping of the transparencies, the result is still usable because of the extremely thin nature of the emulsion layer and the fact that when the transparencies are placed together, they are in wet condition with the elements fairly pliable so that an accommodation of the layers can be achieved.

There can be many variations made in the process described herein without departing from the spirit of the invention. Although there have been specific chemicals or preparations referred to as being used in the process, other similar substances may be alternatively employed and minor variations may be made. For example, where the description above states that a transparency is placed into a tray containing a particular liquid, it might well be that the liquid can be flowed or painted onto the surfaces of the transparencies. Individual practitioners in the photographic laboratory will make minor variations, of one type or another, all still within the general scope of the concept of this invention. Accordingly, the following claims should be interpreted in light of the scope of the new process described herein and should be interpreted consistent with the spirit and scope of the invention.

What we claim is:

1. A process for the production of composite color transparencies comprising the steps of softening a first color transparency from which the acetate backing has been removed in a softening liquid, applying adhesive to said first transparency, placing said first transparency onto a film base in intimate contact therewith and allowing the same to set, softening a second transparency from which the acetate backing has been removed in a softening liquid, placing said second transparency over said first transparency in wet condition at a desired location with respect to said second transparency, cutting said first and second transparency while both transparencies are wet and are held in stationary relationship with one to the other along the outline desired for a composite end product, removing the excess materials of the first and second transparency, securing the retained portion of the second transparency to the film base in the desired composite relationship with the remaining portion of the first transparency and allowing same to set in place, and securing a single piece of strip film to the exposed surfaces of said first and second transparencies to complete said composite transparency.

2. A process in accordance with claim 1 wherein said softening liquid for said first transparency includes warm water.

3. A process in accordance with claim 2 wherein said softening liquid for said second transparency includes warm water.

4. A process in accordance with claim 3 wherein said softening liquid for said second transparency includes a wetting agent and strip film cement.

5. A process in accordance with claim 3 wherein said softening steps included placing said transparencies in a bath of said softening liquid.

6. A process in accordance with claim 3 wherein said transparencies are secured to said film base, dry film cement applied by emersing said transparencies in a bath of strip film cement.

7. A process in accordance with claim 1 wherein said film base is an ortho film base.

References Cited

UNITED STATES PATENTS 2,575,970   11/1951   Nagel _____ 96—11

NORTON ANSHER, Primary Examiner

R. L. MOSES, Assistant Examiner

U.S. Cl. X.R.

96—42